United States Patent
Engelhardt et al.

(10) Patent No.: US 8,587,526 B2
(45) Date of Patent: Nov. 19, 2013

(54) GESTURE RECOGNITION FEEDBACK FOR A DUAL MODE DIGITIZER

(75) Inventors: Leonard Engelhardt, Moshav Ora (IL); Jonathan Moore, Tel-Aviv (IL)

(73) Assignee: N-trig Ltd., Kfar-Saba (IL)

( * ) Notice: Subject to any disclaimer, the term of this patent is extended or adjusted under 35 U.S.C. 154(b) by 1327 days.

(21) Appl. No.: 11/783,860

(22) Filed: Apr. 12, 2007

(65) Prior Publication Data

US 2007/0242056 A1  Oct. 18, 2007

Related U.S. Application Data

(60) Provisional application No. 60/791,205, filed on Apr. 12, 2006.

(51) Int. Cl.
*G09G 5/00* (2006.01)

(52) U.S. Cl.
USPC ........ 345/173; 345/174; 345/179; 178/18.06; 178/18.05; 178/18.04; 178/19.01; 178/19.04; 178/19.05; 340/407.1

(58) Field of Classification Search
USPC ......... 345/173, 174, 175, 176, 177, 178, 179; 178/18.01, 18.06, 18.05, 18.04, 19.01, 178/19.04, 19.05; 340/407.1
See application file for complete search history.

(56) References Cited

U.S. PATENT DOCUMENTS

| | | | |
|---|---|---|---|
| 649,593 A | 5/1900 | Black | |
| 2,517,457 A | 8/1950 | Allen | |
| 5,365,461 A * | 11/1994 | Stein et al. | 700/298 |
| 5,777,607 A * | 7/1998 | Koolen | 345/174 |
| 5,956,020 A * | 9/1999 | D'Amico et al. | 345/173 |
| 6,498,601 B1 * | 12/2002 | Gujar et al. | 345/173 |
| 6,690,156 B1 | 2/2004 | Weiner et al. | |
| 6,791,536 B2 | 9/2004 | Keely et al. | |
| 7,190,348 B2 * | 3/2007 | Kennedy et al. | 345/168 |
| 2002/0080123 A1 * | 6/2002 | Kennedy et al. | 345/173 |
| 2003/0146907 A1 * | 8/2003 | Boals et al. | 345/179 |
| 2004/0051467 A1 * | 3/2004 | Balasubramaniam et al. | 315/149 |
| 2004/0095333 A1 | 5/2004 | Morag et al. | |
| 2004/0155871 A1 | 8/2004 | Perski et al. | |
| 2005/0052427 A1 | 3/2005 | Wu et al. | |
| 2005/0275638 A1 | 12/2005 | Kolmykov-Zotov et al. | |
| 2006/0012580 A1 * | 1/2006 | Perski et al. | 345/173 |
| 2006/0026536 A1 | 2/2006 | Hotelling et al. | |
| 2006/0109252 A1 * | 5/2006 | Kolmykov-Zotov et al. | 345/173 |

FOREIGN PATENT DOCUMENTS

| | | |
|---|---|---|
| BE | 432 900 A | 3/1939 |
| FR | 96 487 E | 6/1972 |
| GB | 621 245 A | 4/1949 |
| GB | 2 402 347 | 12/2004 |
| JP | 2002-342033 | 11/2002 |
| WO | WO2007/005427 | 1/2007 |

OTHER PUBLICATIONS

Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

* cited by examiner

*Primary Examiner* — Lun-Yi Lao
*Assistant Examiner* — Olga Merkoulova (57) ABSTRACT

A system and method for providing feedback to a user making a gesture for switching between at least two types of user interactions used to operate a digitizer system, the method comprising recognizing the gesture to switch between the types of user interactions, switching the type of user interaction used to operate the digitizer system, and providing feedback to the user indicating recognition of the gesture.

24 Claims, 6 Drawing Sheets

GESTURE RECOGNITION FEEDBACK FOR A DUAL MODE DIGITIZER

RELATED APPLICATION

The present application claims the benefit under section 35 U.S.C. §119(e) of U.S. Provisional Application No. 60/791,205 filed on Apr. 12, 2006 which is hereby incorporated by reference.

FIELD OF THE INVENTION

The present invention relates to a digitizer, and more particularly, but not exclusively to a digitizer for inputting multiple types of user interactions to a computing device.

BACKGROUND OF THE INVENTION

Touch technologies are commonly used as input devices for a variety of products. The usage of touch devices of various kinds is growing sharply due to the emergence of new mobile devices such as Personal Digital Assists (PDA). Tablet PCs and wireless flat panel display (FPD) screen displays. These new devices are usually not connected to standard keyboards, mice or like input devices, which are deemed to limit their mobility. Instead there is a tendency to use touch input technologies of one kind or another.

Some of the new mobile devices, such as the Tablet PC, are powerful computer tools. Devices such as the Tablet PC use a stylus based input device, and use of the Tablet PC as a computing tool is dependent on the capabilities of the stylus input device. The input devices have the accuracy to support handwriting recognition and full mouse emulation, for example hovering, right click, etc. Manufacturers and designers of these new mobile devices have determined that the stylus input system can be based on various electromagnetic technologies, which can satisfy the high performance requirements of the computer tools in terms of resolution, fast update rate, and mouse functionality.

U.S. Pat. No. 6,690,156 entitled "Physical Object Location Apparatus and Method and a Platform using the same" and US Patent Publication No. 20040095333 entitled "Transparent Digitizer" both of which are assigned to N-trig Ltd., the contents of both which are hereby incorporated by reference, describe an electromagnetic method for locating physical objects on a FPD and a digitizer that can be incorporated into the active display screen of an electronic device.

U.S. Pat. No. 6,791,536, entitled "Simulating Gestures of a Pointing Device using a Stylus and Providing Feedback Thereto, assigned to Microsoft Corporation, the contents of which are hereby incorporated by reference, describes a system and method for simulating a gestures using a stylus and choosing an action to be performed in response to the stylus gesture.

U.S. Patent Publication No. 20040155871 entitled "Touch detection for a digitizer" assigned to N-trig, the contents of which are hereby incorporated by reference, describes capacitive methods for touch detection. The capacitive touch detection methods allow finger and touch detection using the same detector and sensor.

US Patent Publication No. 20050275638, entitled "Dynamic Feedback for Gestures", assigned to Microsoft Corporation, the contents of which are hereby incorporated by reference, describes stylus gesture feedback techniques to provide feedback to users concerning the recognition of a stylus gesture.

U.S. Patent Application Publication No. 20060012580, entitled "Automatic switching for a dual mode digitizer" assigned to N-Trig, the contents of which are hereby incorporated by reference, describes a method and apparatus for switching between different types of user interactions and appropriately utilizing different types of user interactions, e.g. electromagnetic stylus and touch, in a digitizer system. A user may initiate switching, e.g. switching from a stylus to a touch user interaction, by performing a defined touch gesture. A user may initiate switching, e.g. switching from a stylus to a touch user interaction, by performing a defined touch gesture.

US Patent Publication No. 20060026536, entitled "Gestures for touch sensitive input devices", assigned to Apple Computer, Inc., the contents of which are hereby incorporated by reference, describes a method and system for processing touch gestures that cause actions to be performed and providing user feedback regarding recognized touch gesture.

SUMMARY OF THE INVENTION

An aspect of some embodiments of the invention is the provision of a system and method for facilitating switching between at least two types of user interactions in the same system and for providing feedback, e.g. temporal and/or static feedback, to the user regarding the switching and/or a presently activated and/or presently selected type of user interaction.

In some embodiments of the present invention, the system is a digitizer system associated with a host computer and the two types of user interaction may include a stylus and a touch, e.g. finger touch. In other examples the type of user interaction may be one or more game pieces and/or simulation tools.

According to some embodiments of the present invention, a user may perform a gesture to indicate to the system a desire to switch to an alternate type of user interaction for operating the host computer, e.g. toggling between user interactions. The system may recognize the gesture and provide feedback, e.g. temporal and/or static feedback, to the user that the gesture was recognized and/or that the type of user interaction operating the host computer has changed.

In one embodiment of the present invention, switching gestures and temporal feedback in response to a switching gesture may be implemented in an automatic mode where a plurality of user interactions may be used interchangeably, e.g. not simultaneously, in an intuitive manner. A switching gesture may be implemented to indicate that a switch is required. Temporal and/or static feedback may be displayed and/or offered to inform the user that the switching gesture has been recognized and the switch may be made, e.g. the user may begin to use an alternate type of user interaction. In response to a gesture to switch a user interaction state and/or mode, the system may only read input from the presently activated user interaction and ignore input from an alternate type of user interaction. In one example, the presently activated user interaction may be a stylus interaction, a finger touch interaction, a game interaction, and/or a plurality of interactions.

An exemplary embodiment of the present invention there is provided a method for providing feedback to a user making a gesture for switching between at least two types of user interactions used to operate a digitizer system comprising recognizing the gesture to switch between the types of user interactions, switching the type of user interaction used to operate the digitizer system, and providing feedback to the user indicating recognition of the gesture.

Optionally the feedback to the user comprises displaying a visual indication.

Optionally the method further comprises sensing the gesture to switch between the types of user interactions and displaying the feedback to the user in an area corresponding to the location where the gesture was sensed.

Optionally the at least two types of user interactions include a primary type of user interaction that is active and a secondary type of user interaction that is inactive and the gesture to switch between the types of user interactions comprises recognizing a gesture performed by the secondary type of user interaction.

Optionally the primary type of user interaction is a stylus.

Optionally the stylus is an electromagnetic stylus.

Optionally the secondary type of user interaction is finger touch.

Optionally the secondary type of user interaction is a stylus.

Optionally the method further comprises recognizing a finger touch gesture indicating a switch from a stylus type of user interaction to a touch type of user interaction.

Optionally the feedback is temporal feedback.

Optionally the feedback is provided for a period between 0.5 seconds and 1.5 seconds.

Optionally the feedback is animated.

Optionally the method further comprising providing feedback indicating to the user a type of user interaction that is currently selected to operate the digitizer system.

Optionally the feedback indicating an active type of user interaction is a static feedback.

Optionally the method further comprising updating the static feedback in response to the gesture.

Optionally the feedback is audio feedback.

Optionally one of the types of user interactions includes a stylus.

Optionally the stylus is an electromagnetic stylus.

Optionally one of the types of user interactions includes a finger touch.

Optionally one of the types of user interactions includes a body part.

Optionally one of the types of user interactions includes a game piece.

Optionally the gesture is a "double tap" touch gesture.

Optionally the digitizer system comprises a digitizer to sense the gesture to switch between the types of user interactions, a controller in communication with the digitizer, and a host computer operated by the digitizer and the controller.

Optionally the controller is integral to the host computer.

Optionally the method further comprises a single digitizer that senses both types of user interactions.

Optionally the controller comprises a gesture recognizer adapted to recognize a pre-defined gesture.

Optionally the digitizer includes a grid of conductive lines patterned on a transparent foil.

Optionally the method further comprising sensing coupling between crossing conductive lines of the digitizer.

Optionally the method further comprises measuring potential differences between the conductive lines of the digitizer.

Optionally the method further comprises a plurality of digitizers, wherein each digitizer is to sense a position of a single type of user interaction.

An exemplary embodiment of the present invention providing a digitizer system for providing feedback to a user making a gesture for switching between at least two types of user interactions used to operate the digitizer system comprising a digitizer to sense the gesture for switching between at least two types of user interactions, a controller in communication with the digitizer, and a host computer operated by the digitizer and the controller adapted to provide feedback to the user upon recognition of the gesture for switching between the at least two types of user interactions used to operate the digitizer system.

Optionally the controller comprises a gesture recognition unit to recognize a gesture to switch the type of user interaction used to operate the digitizer system and a switching unit to switch between the at least two types of user interaction used to operate the digitizer system.

Optionally the controller is integral to the host computer.

Optionally the system further comprises a single digitizer that senses both types of user interactions.

Optionally the host computer is adapted to recognize the gesture for switching between the at least two type of user interactions used to operate the digitizer system.

Optionally the controller comprises a gesture recognizer adapted to recognize a pre-defined gesture.

Optionally the digitizer includes a grid of conductive lines patterned on a transparent foil.

Optionally the system is adapted to sense coupling of crossing conductive lines of the digitizer.

Optionally the system is adapted to measure measuring differences between the conductive lines of the digitizer.

Optionally the controller is adapted to recognize a finger touch gesture indicating a switch from a stylus user interaction to a finger touch user interaction.

Optionally the stylus user interaction is an electromagnetic stylus.

Optionally the host computer includes a monitor and wherein the feedback is displayed on the monitor.

Optionally the feedback is displayed at a location on the monitor corresponding to a location where the gesture was sensed.

Optionally the digitizer is positioned to overlay the monitor.

Optionally the system further comprises a plurality of digitizers, wherein each digitizer senses a position of a single type of user interaction.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description of non-limiting exemplary embodiments, when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following description, exemplary embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without the specific details presented herein. Furthermore, well-known features may be omitted or simplified in order not to obscure the present invention. Features shown in one embodiment may be combined with features shown in other embodiments. Such features are not repeated for clarity of presentation. Furthermore, some unessential features are described in some embodiments.

Figure 1:
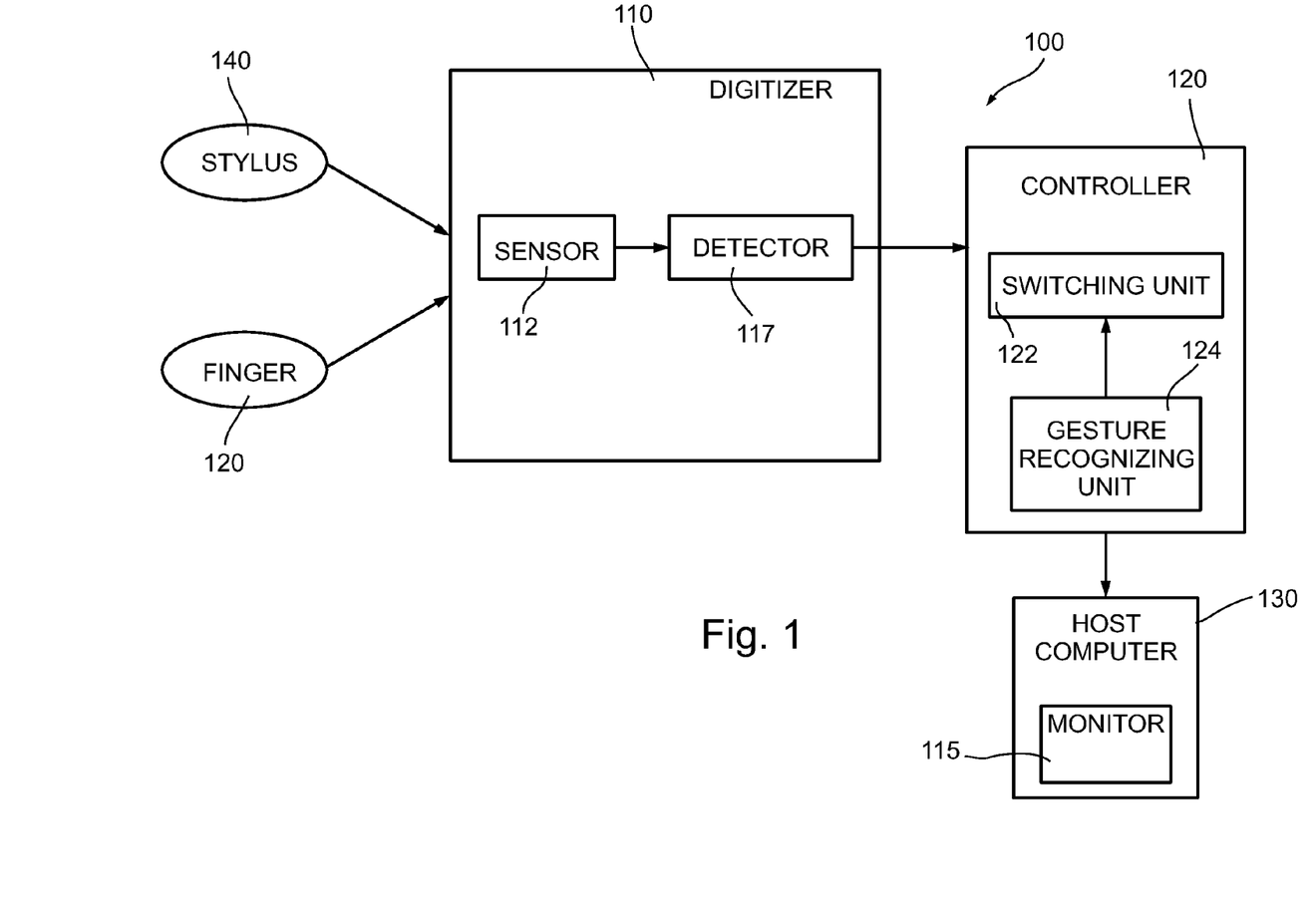
FIG. 1 is a schematic block diagram of a dual mode digitizer system according to an embodiment of the present invention.

Reference is now made to FIG. 1 showing a schematic block diagram of a dual mode digitizer system 100 according to an embodiment of the present invention. According to some embodiments of the present invention digitizer system 100 may include a digitizer 110, a controller 120 and a host computer 130. The host computer may be, for example a personal computer, a personal digital assistant (PDA) and/or other computing device including a monitor and/or display screen 115 to display a graphical user interface. The digitizer 110 may include a sensor 112 to sense user interactions, e.g. stylus 140, finger 120, and/or other types of user interactions, a detector 117 to detect the position of the sensed user interactions and/or to identify a type of user interaction. Digitizer 110 may be positioned to overlay monitor 115. Digitizer system 100 may additionally include a controller 120 in communication with detector 117. A gesture recognizer unit 124 and a switching unit 122 may for example be integral to controller 120. Gesture recognizer unit 124 may identify a gesture, e.g. a finger touch gesture and switching unit 122 may be responsible for switching between different types, modes and/or states of user interactions, e.g. stylus mode and/or finger mode. Controller 120 may transmit data to a host computer 130 for further processing and/or analysis. According to embodiments of the present invention, controller 120 may facilitate displaying an indication on monitor 115 to indicate that a switching between different modes of user interaction occurred. In one example a switching gesture sensed by sensor 112 and detected by detector 117 may provide input to switching unit 122 that a switching gesture was sensed, detected and/or recognized. This in turn may trigger an indication, for example on monitor 115, to indicate that the mode of operation of the system has changed and/or the present mode of the system and the user may switch to an alternative type of user interaction.

According to some embodiments of the present invention, digitizer 110 may be an electromagnetic transparent digitizer that may be mounted on top of a display. In some embodiments of the present invention, the digitizer may be similar to embodiments described in incorporated U.S. Pat. No. 6,690,156 and detailed in incorporated US Patent Application Publication No. 20040095333.

In some embodiments of the present invention, sensor 112 may include a grid of conductive lines made of conductive materials patterned on or within a transparent foil. In some embodiments of the present invention, the sensor 112 may be similar to embodiments described in incorporated US Patent Application Publication No. 20040095333.

According to some embodiments of the present invention, detector 117 may be similar to embodiments described in incorporated US Patent Application Publication No. 20040095333, e.g. described in reference to FIG. 5 of the incorporated application). For example, detector 117 may include differential amplifiers to amplify signals generated by sensor 112. Optionally, the signals may be forwarded to a switch, which selects the inputs to be further processed. The selected signal may be amplified and filtered, for example by a filter and amplifier prior to sampling. The signal may then be sampled by an analog to digital converter (A/D) and sent to a digital unit via a serial buffer. A digital signal processing (DSP) core, which performs the digital unit processing, may read the sampled data, process it and determine the position of the physical objects, such as stylus or finger. Calculated position may, for example be sent to the host computer.

According to some embodiments of the present invention, stylus 140 is a passive element. Optionally, stylus 140 may include, for example an energy pick-up unit and an oscillator circuit. Optionally, stylus 140 may include a resonance circuit. An external excitation coil associated with sensor 112 provides the energy for the stylus 140. Optionally, a battery operated stylus may be implemented. In one example, the position of stylus 140 may be determined by detector 117, based on the signals sensed by sensor 112. Optionally, more than one stylus is used.

According to other embodiments of the present invention, touch detection methods may be similar to methods described in incorporated U.S. Patent Application Publication No. 20040155871. For example, the method for detecting finger input 120, e.g. finger touch may be based on difference in potential, for example a difference in potential in reference to ground potential, between a user's body and sensor 112 and/or a difference in potential between the conductive lines of the digitizer. In another embodiment, detection of finger input 120 may utilize a trans-conductance or trans-capacitance between adjacent or crossing conductive lines of sensor 112 to determine finger touch location. The sensor 112 and/or detector 117 may for example sense coupling between crossing conductive lines in the digitizer.

According to yet other embodiments of the present invention switching unit 122 may receive information from the gesture recognizer unit 124 regarding an identified gesture to switch user interactions, e.g. switching gestures, and may switch a mode of user interactions for operating the host computer as described herein.

According to some embodiments of the present invention, the digitizer system 100 may include several digitizers 110, where each digitizer 110 is capable of detecting a single type of user interaction, e.g. stylus, finger touch, and other types of user interactions. In such embodiments, a plurality of digitizers 110 may be associated with a single host computer 130 and gesture recognition unit 124 and switching unit 122 and/or their functionality may be integrated into host computer 130.

Figure 2:
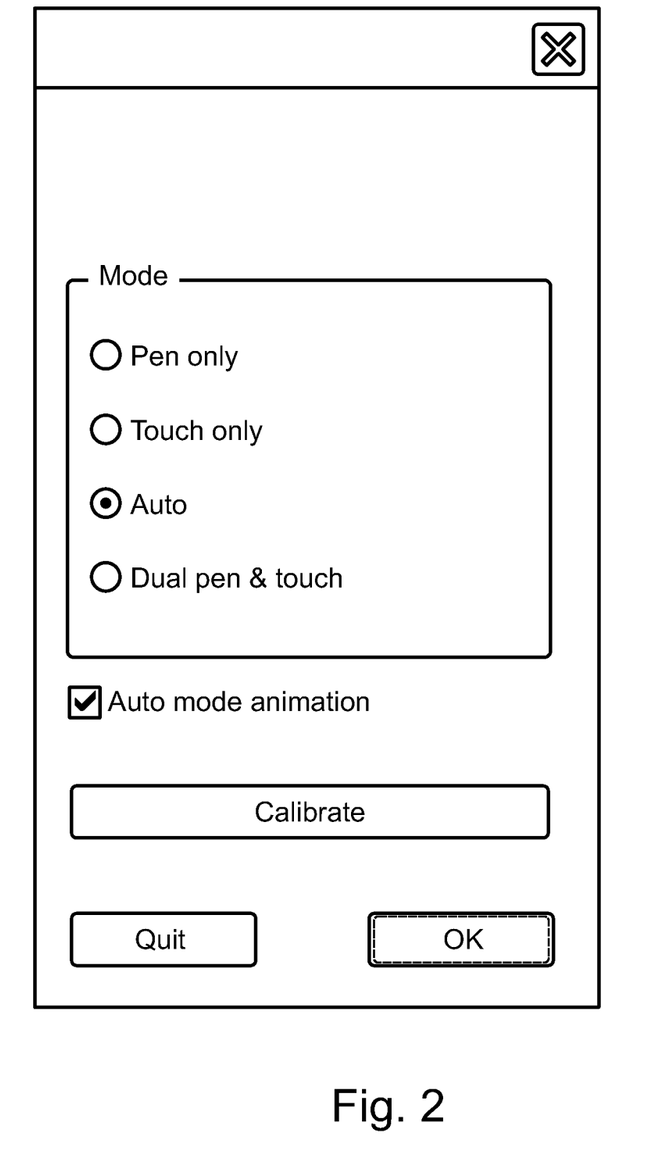
FIG. 2 is a sample graphical user interface to select a mode of operation according to an embodiment of the present invention.

Reference is now made to FIG. 2 displaying a sample graphical user interface (GUI) to select a mode of operation according to embodiments of the present invention. Embodiments of the present invention may include four modes of operation, stylus only mode, e.g. "pen only", finger only mode, e.g. "touch only", automatic mode, e.g. "auto", and dual mode, e.g. "dual pen & touch". In one example, switching from one of the exemplary four modes to another may alternatively be performed manually by, for example clicking with an active input device on an icon in the system tray to activate a input display, e.g. GUI shown in FIG. 2, and choosing a desired mode.

Figure 3:
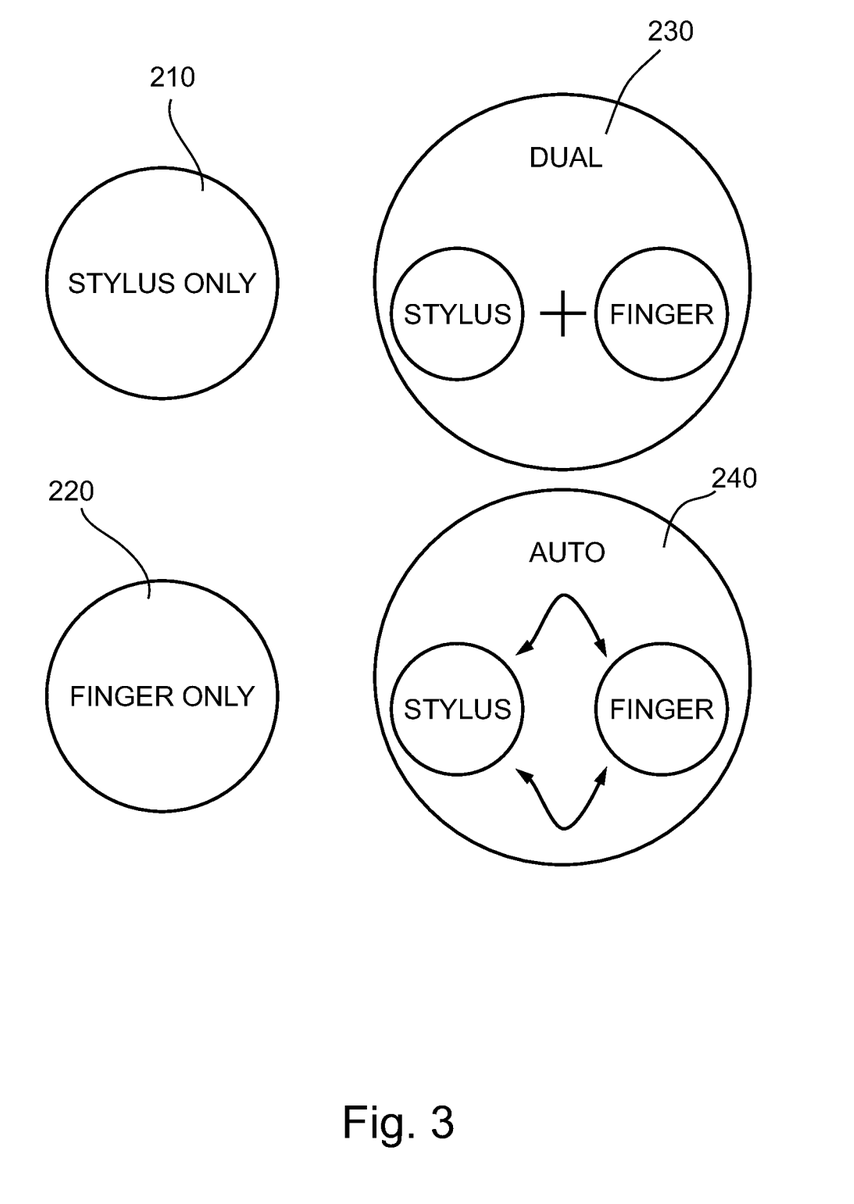
FIG. 3 is a schematic representation of the four different modes of operation according to an embodiment of the present invention.

Reference is now made to FIG. 3 showing a schematic representation of the four different modes of operation according to embodiments of the present invention. In stylus only mode 210, the digitizer system may only process stylus sensed input and/or forward stylus sensed input to host computer 130. In one example, in stylus only mode detected and/or sensed finger and/or finger touch data may not be forwarded to the host computer. In other examples, finger and/or finger touch related sensor and/or circuitry may be deactivated and/or partially deactivated. Optionally, the system 100 may support more than one stylus in stylus mode 210 and/or different types of physical objects, e.g. game pieces that may all be recognized during stylus only mode.

In finger only mode 220, the digitizer system may only process finger sensed input. In one example, detected and/or sensed stylus input may be ignored while in finger only mode. Optionally, the digitizer system 100 may support multi-touch, hence several fingers can be used and or other body parts may be used, such as palm, arm, feet, and or other parts. In other examples, stylus related sensor and/or circuitry may be deactivated and/or partially deactivated.

In dual mode 230 both stylus and finger input may be forwarded to the host computer 130, optionally sensed substantially simultaneously, and processed. For example, input from both the stylus and the finger may be sensed substantially simultaneously on the same digitizer. In other examples, stylus input and finger input may not be read and/or sensed substantially simultaneous.

In automatic mode 240, the system 100 may toggle between stylus state 242 and finger state 244. Automatic mode 240 may be appropriate and/or helpful for specific applications that may require and/or call for intuitively toggling between different types of user interactions. This may allow a user to avoid cumbersome manual switching between modes, e.g. switching requiring activating and clicking on specific GUI screens, when, for example a substantial amount of switching may be required. For specific applications, automatic mode may be preferable over dual mode. Automatic mode may, for example, facilitate avoiding errors due a user placing a type of user interaction that is not currently used near the digitizer. For example, during a finger touch user interaction, the presence of a stylus in the near vicinity may introduce input errors. In other examples, some systems may not support dual mode.

Figure 4A:
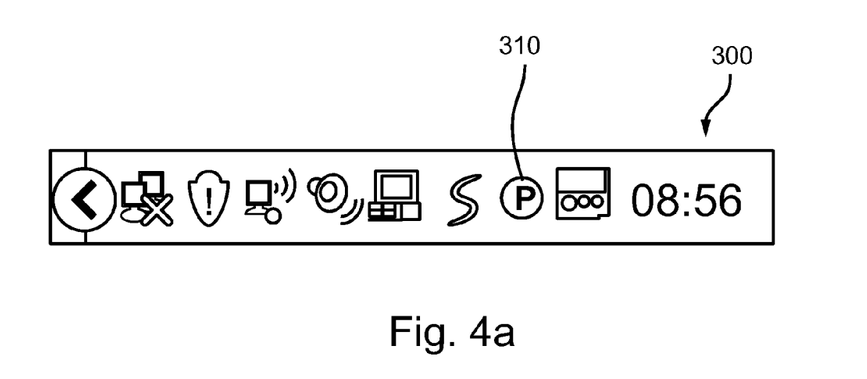
FIGS. 4A and 4B are illustrations of a sample tray bars according to embodiments of the present invention.
Figure 4B:
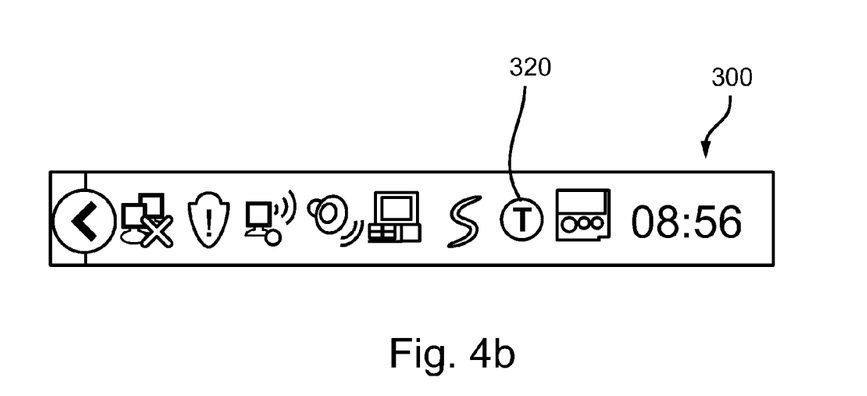

Reference is now made to FIGS. 4A and 4B illustrating sample tray bars according to embodiments of the present invention. In one embodiment of the present invention, the default state for automatic mode 240 is the stylus state as long as the stylus is in range of the tablet screen, e.g. the stylus is hovering in proximity or in contact. During the stylus state a static indication of the stylus state may appear as an icon 310 displayed on the tray bar 300 (FIG. 3A). The icon 310 'P' stands for pen. Other suitable icons may be used to indicate that the current state in automatic mode is the stylus state. The icon 310 provides static feedback to the user as to current operating state of the system, e.g. the stylus state and is maintained, e.g. displayed the entire time that the stylus state is active. In other embodiments, the finger mode may be the default mode.

When wishing to switch between different types of user interactions in automatic mode 240, a switching gesture may be required, such as a "double tap" finger gesture over the digitizer 110 and/or monitor 115, e.g. similar in style to a mouse double-click. When a finger touch gesture is recognized by the system 100, optionally by the gesture recognizer unit 124, the switching unit 122 may switch from stylus state to finger state and an indication of the switching appears in the icon 320 displayed in the system tray bar 300 (illustrated in FIG. 3B). The icon 320 'T' stands for touch, e.g. finger touch. Other suitable icons may be used to indicate that the current state in automatic mode is the finger state. The icon 320 provides static feedback to the user as to current operating state of the system, e.g. the finger state, and is displayed the entire time that the finger state is active. Optionally, different gestures may be implemented, e.g. drawing a circle with the finger, and/or drawing an X shape with the finger. In other embodiments, the switching gesture may be a stylus gesture, e.g. "double tap" stylus gesture, drawing a circle with the stylus, and/or drawing an X shape with the stylus.

According to embodiments of the present invention, at the onset of state switching between stylus state and finger state a temporal indication and/or feedback is provided to the user to indicate that the switching gesture has been successfully recognized. For example, in reaction to a recognized switching gesture for example, by sensor 112, detector 117, switching unit 122 and/or gesture recognizer unit 124, the digitizer system 100 may display temporal feedback to the user on monitor 115 indicating that a switching of user interaction state occurred, e.g. the gesture was successfully recognized. In some embodiments of the present invention, the temporal feedback may be in addition to the static feedback, e.g. icon 310 and 320, and/or may be instead of the static feedback.

In some examples, the type of user interaction currently in use and/or currently active may be defined by the digitizer system 100 as the primary type of user interaction and the other available types of user interaction may be defined as secondary types of user interaction. The switching gesture may be a gesture performed with a secondary type of user interaction and the feedback may be given in response to a switching gesture preformed by the secondary type of user interaction. For example, if the active type of user interaction is the stylus, the stylus may be defined as the primary user interaction, while the other available type, the finger touch type of user interaction may be defined as a secondary type of user interaction. In this example, the digitizer system 100 may require a finger touch switching gesture and may only give feedback to the user after a finger touch switching gesture was recognized.

Figure 5A:
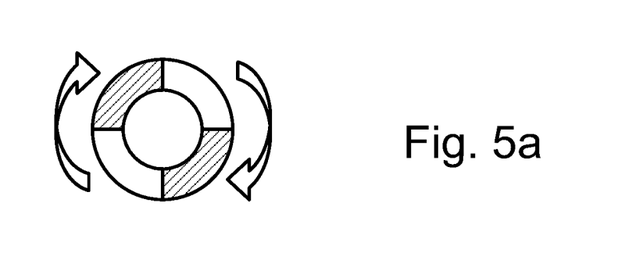
FIGS. 5A, 5B and 5C are sample temporal graphical feedbacks and/or indications according to embodiments of the present invention.
Figure 5B:
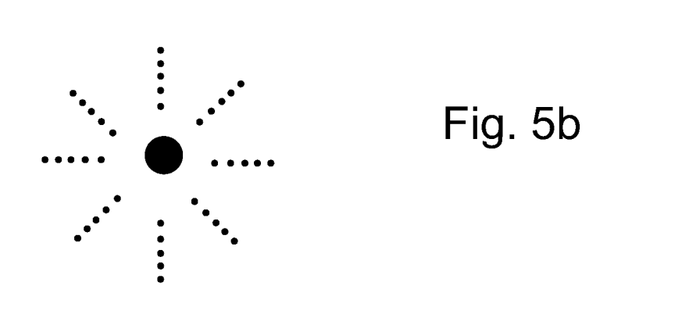
Figure 5C:
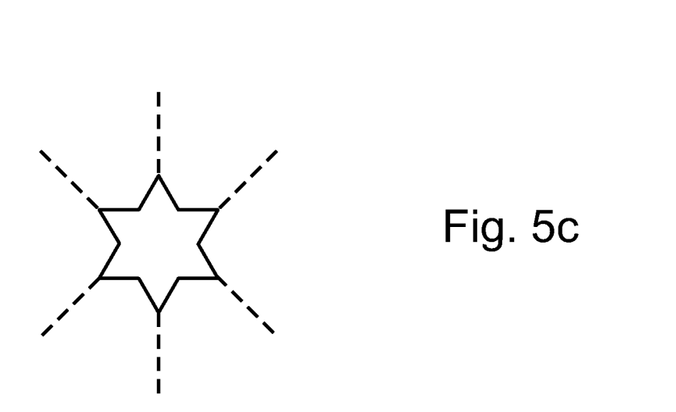

Reference is now made to FIGS. 5A, 5B, and 5C illustrating exemplary temporal graphical feedback according to embodiments of the present invention. Optionally, the temporal feedback may be in a form of a flashing-rotating circle that may temporarily appear on the screen at the location of the cursor (FIG. 5A). In another embodiment of the present invention, the temporal graphical feedback may be a flashing star (FIG. 5B and/or FIG. 5C). In other examples, the temporal graphical feedback may not flash and/or rotate. In yet other examples, the temporal feedback may include other animations. A user may for example, choose the temporal feedback from a database of icons, e.g. choose a cartoon figure to indicate switch gesture recognition. A user may also select between, for example, audio and/or graphical feedback. Other suitable temporal graphical feedbacks may be implemented, e.g. a graphical illustration of a stylus and/or a finger to indicate respectfully a stylus and finger state. Other different indications of the change of state in various directions may be used. In some examples, the temporal feedback may be a textual feedback, e.g. a message indicating the new state and/or a change in state. In other examples, the temporal feedback may be visual feedback displayed in an area corresponding to the area on the digitizer 110 and/or monitor 115 where the switching gesture was sensed and/or made. For example, if a switching gesture is defined as a double tap on a monitor and/or digitizer, the visual feedback may be positioned in the area where the user tapped the digitizer and/or monitor. Optionally, an audio and/or tactile temporal feedback may be implemented in addition and/or instead of a temporal visual feedback. In embodiments of the present invention, the temporal feedback may be displayed for approximately 0.5 seconds to 1.5 seconds.

The invention is not limited to switching gestures, and static and temporal user feedback implemented for switching states within automatic mode. In other embodiments of the present invention, one or more switching gestures may be defined for switching between different modes, e.g. automatic mode, dual mode, stylus only mode, finger only mode. Static and temporal user feedback may be implemented to provide sufficient indication to the user that the switching gesture was successfully recognized and that the switching occurred. In addition, switching between more than two types of user interactions may be implemented and/or switching between types of user interactions other than stylus and finger may be implemented. For example switching between different recognized game pieces may be implemented and context appropriate temporal as well as static feedback may be provided by the system to inform the user of a switching and/or of a new state and/or mode.

According to some embodiments of the present invention, temporal and static feedback may be provided to indicate switching between different users. For example, when two users play a game and take turns using a user interaction, for example a stylus, a switching gestures may be used to indicate to the digitizer system 100 when switching of users occurred, e.g. switching at the end of one users turn in the game. In embodiments including more than one stylus, a switching gesture may be used to indicate the currently active and/or relevant stylus. Temporal and/or static feedback may be provided to the user when a switching gesture was recognized. In this example, the feedback may provide clear indication to the users and/or players when to switch turns, so that the system will correctly recognize the new user input. In some examples, system recognition of the user and/or player may allow the system to monitor and/or limit actions and/or input of the users to actions and/or inputs that may be defined as appropriate to that user.

Figure 6:
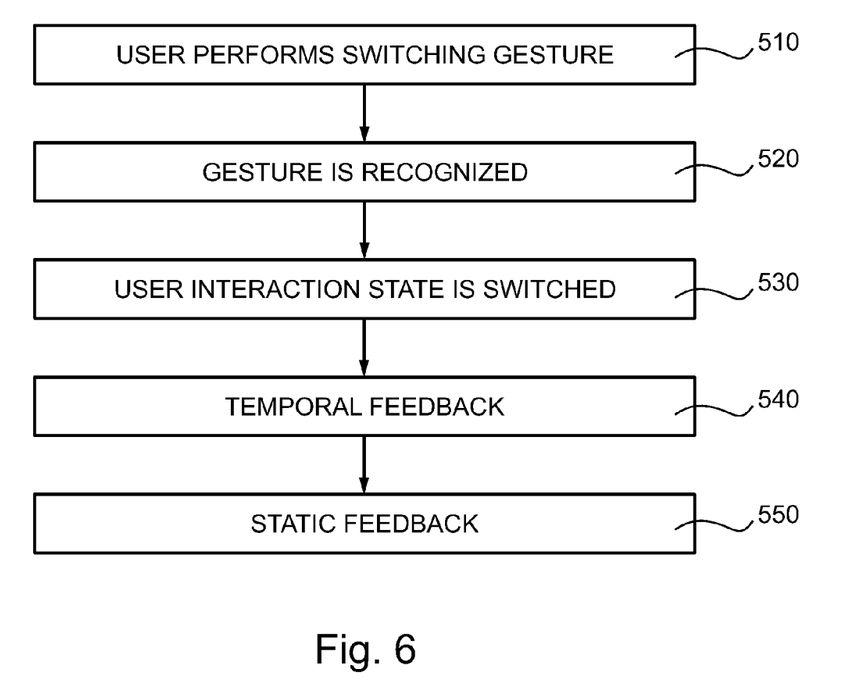
FIG. 6 is a sample flow chart describing a method for providing feedback to a user that a switching gesture was recognized according to an embodiment of the present invention.

Reference is now made to FIG. 6 showing a sample flow chart describing a method for providing feedback to a user that a switching gesture was recognized according to an embodiment of the present invention. In block 510 a switching gesture may be performed by a user. The switching gesture may be a predefined gesture as may be described herein. For example, a switching gesture may include a "double tap" finger gesture over monitor 115, e.g. similar in style to a mouse double-click. Alternatively, a switching gesture may be a "double tap" stylus gesture, and/or any other defined gesture.

In block 520, the digitizer system 100 may recognize the switching gesture with gesture recognizer 124. For example, the gesture may be sensed by sensor 112 and detected by detector 117. Recognition of the switching gesture may be performed by methods similar to those described in incorporated reference U.S. Patent Application Publication No. 20060012580. Other suitable methods may be implemented to recognize gestures.

In block 530, a user interaction state may be switched, e.g. via switching unit 122. For example, the user interaction state may switch from a stylus state to a finger state.

According to some embodiments of the present invention, recognition of the gesture and switching of the type of user interaction state may be performed by the host computer. In other embodiments recognition of the gesture and switching of the type of user interaction state may be performed by a local controller 120 associated with a digitizer 110.

In block 540, temporal feedback may be given to the user. The temporal feedback may indicate to the user that the switching gesture was successfully recognized and that the user may now proceed to use an alternate type of user interaction as input to the digitizer system. Temporal feedback may be graphical, audio, tactile, and/or a combination thereof. Temporal feedback may be as described herein, e.g. described in FIGS. 5A-C, and/or maybe other suitable temporal feedbacks.

In block 550, static feedback may be displayed to the user during the entire period of the specified user interaction state. Static feedback may be in the form of icons on a tool tray as may have been described herein, e.g. described in reference to FIGS. 4A-B, and/or may be other suitable static feedbacks. Static feedback may provide a user with indication as to what is the current state of user interaction through out the period of the active state. Such feedback may be useful, for example if a user walks away and/or disengages from interaction with the digitizer system for a period and then returns. During this period, the user may forget what user interaction state is currently active. Other suitable steps may be included and/or less than all the indicated steps may be required.

According to embodiments of the present invention, the digitizing system 100 may be a transparent digitizer for a mobile computing device that may use, for example a FPD screen. The mobile computing device can be any device that may enable interactions between a user and the device. Examples of such devices are—Tablet personal computers (PC), pen enabled lap-top computers, PDA or any hand held devices such as Palm Pilots and mobile telephones. In one example, the mobile device may be an independent computer system including a dedicated CPU. In different embodiments the mobile device may be a part of wireless system such as a wireless mobile screen for a PC.

In some examples, the digitizer may, for example detect the position of at least one physical object in high resolution and at a high update rate. Example physical object may include stylus, user's finger (i.e. touch) or any other suitable conductive object touching the screen. The physical object may be used for pointing, painting, writing, writing including hand writing recognition, and any other activity that is typical for user interaction with the system 100. The system may detect single or multiple finger touches. The system may detect several electromagnetic objects, either separately or simultaneously. Furthermore, the finger touch detection may be implemented simultaneously with stylus detection. Hence, it is capable of functioning as a finger touch detector as well as detecting a stylus When the physical object, e.g. the user interactions, in use is a stylus the digitizer may supports full mouse emulation. As long as the stylus hovers above the FPD, a mouse cursor may follow the stylus position. In some examples, touching the screen stands for left click and a special switch located on the stylus emulates right click operation. In other examples, the mouse cursor may follow the finger position when the finger may be hovering over the digitizer.

In addition to mouse emulation, the stylus may support additional functionality such as an eraser, change of color, etc. In other embodiments the stylus may be pressure sensitive and changes its frequency or change other signal characteristics in response to user pressure.

According to some embodiments of the present invention, the stylus 140 may be a passive stylus. Optionally, the stylus may include an energy pick-up circuit to energize an oscillator circuit. Optionally, the stylus may include a resonance circuit. An external excitation coil surrounding the sensor may provide electromagnetic energy to the stylus. However, other embodiments may include an active stylus, battery operated or wire connected, which does not require external excitation circuitry and/or a resonance stylus.

According to some embodiments of the present invention, an electromagnetic object responding to the excitation is a stylus. However, other embodiments may include other passive physical objects, such as gaming pieces. Optionally, the physical objects comprise a resonant circuit. Optionally the physical object comprises an energy pick up circuit and an oscillator circuit. Embodiments describing gaming tokens comprising a resonant circuit may be similar to embodiments described in incorporated U.S. Pat. No. 6,690,156.

According to yet another embodiment of the invention, the digitizer may be integrated into the host device on top of the FPD monitor. In additional embodiments the transparent digitizer may be provided as an accessory that may be placed on top of a monitor.

According to some embodiments of the present invention, the digitizer system 100 may support one stylus. However, in different embodiments the digitizer system may support more than one stylus operating simultaneously on the same screen. Such a configuration is very useful for entertainment application where few users can paint or write to the same paper-like screen.

According to some embodiments of the present invention, the digitizer may be implemented on a set of transparent foils. However, for some embodiments the present invention may be implemented using either a transparent or a non-transparent sensor. In one example, the digitizer may be a Write Pad device, which is a thin digitizer that is placed below normal paper. In this example, the stylus may combine real ink with electromagnetic functionality. The user writes on the normal paper and the input is simultaneously transferred to a host computer to store or analyze the data.

An additional example for embodiment of a non-transparent sensor is an electronic entertainment board. The digitizer, in this example, is mounted below the graphic image of the board, and detects the position and identity of gaming figures that are placed on top the board. The graphic image in this case is static, but it could be manually replaced from time to time (such as when switching to a different game).

In some embodiments of the present invention a non-transparent sensor could be integrated in the back of a FPD. One example for such an embodiment is an electronic entertainment device with a FPD display. The device could be used for gaming, in which the digitizer detects the position and identity of gaming figures. It could also be used for painting and/or writing in which the digitizer detects one or more styluses. In most cases, a configuration of non-transparent sensor with a FPD will be used when high performance is not critical for the application.

It should be further understood that the individual features described hereinabove can be combined in all possible combinations and sub-combinations to produce exemplary embodiments of the invention. The examples given above are exemplary in nature and are not intended to limit the scope of the invention which is defined solely by the following claims.

The terms "include", "comprise" and "have" and their conjugates as used herein mean "including but not necessarily limited to".

What is claimed is:

1. A method for switching between a first and second type of user interaction for operating a computing device with a digitizer system and for providing feedback to a user making a gesture for initiating the switching, the method comprising:
using only input obtained with the first type of user interaction to operate the computing device while ignoring all input obtained with the second type of user interaction other than a first gesture, the first gesture predefined for indicating a desire to switch to operating the computing device with the second type of user interaction;
recognizing the first gesture obtained with the second type of user interaction;
providing feedback to the user indicating that only the second type of user interaction is being used to operate the computing device, the feedback provided in response to recognition of the first gesture; and
using only input obtained with the second type of user interaction to operate the computing device in response to recognition of the first gesture.

2. The method according to claim 1 wherein providing the feedback to the user comprises displaying a visual indication.

3. The method according to claim 1 comprising:
sensing a location on the digitizer system at which the first gesture was performed; and
displaying the feedback to the user in an area corresponding to the location that was sensed.

4. The method according to claim 1 wherein the first type of user interaction is a stylus.

5. The method according to claim 4 wherein the stylus is an electro-magnetic stylus.

6. The method according to claim 1 wherein the second type of user interaction is finger touch.

7. The method according to claim 1, wherein the first gesture is a finger touch gesture.

8. The method according to claim 1 wherein the feedback is temporal feedback.

9. The method according to claim 8 wherein the feedback is provided for a period between 0.5 seconds and 1.5 seconds.

10. The method according to claim 8 wherein the feedback is animated.

11. The method according to claim 1 wherein the feedback is audio feedback.

12. The method according to claim 1 wherein the second type of user interaction is a finger touch.

13. The method according to claim 1 wherein the second type of user interaction is a body part.

14. The method according to claim 1 wherein one of the first and second type of user interaction is a game piece.

15. The method according to claim 1 wherein the first gesture is a "double tap" touch gesture.

16. The method according to claim 1, wherein in response to recognition of the first gesture, subsequent input obtained with first type of user interaction is only used to recognize a second gesture to switch to the first type of user interaction.

17. The method according to claim 1, wherein each of the first and second type of user interactions is detected by a separate digitizer of the digitizer system, and wherein switching to operating the computing device with the input obtained with the second type of user interaction includes switching the digitizer used to operate the computing device.

18. The method according to claim 1, comprising:
recognizing a second gesture when performed by the user, the second gesture predefined to indicate a desire to switch to operating the computing device with the first type of user interaction; and
using only input obtained with the first type of user interaction to operate the computing device while ignoring all input obtained with the second type of user interaction in response to recognition of the second gesture.

19. The method of claim 18, wherein the first gesture is the same as the second gesture.

20. The method of claim 18, wherein the first and second gestures are performed with the same type of user interaction.

21. The method of claim 18, wherein both the first and second gestures are performed with finger touch.

22. The method of claim 1, comprising ignoring the input obtained with the first type of user interaction in response to recognition of the first gesture.

23. A method for switching between a stylus and finger for operating a computing device with a digitizer system and for providing feedback to a user making a gesture for initiating the switching, the method comprising:
forwarding only input obtained with the stylus to the computing device while ignoring for forwarding to the computing device all input from the finger other than a first gesture, the first gesture predefined for indicating a desire to switch to operating the computing device with the finger;
recognizing the first gesture when performed with the finger;
providing feedback to the user in response to the recognizing; and
forwarding only input obtained with the finger to operate the computing device in response to recognizing the first gesture.

24. The method according to claim 23, comprising:
ignoring all input from the stylus for forwarding to the computing device other than a second gesture, the second gesture predefined for indicating a desire to switch to operating the computing device with the stylus;
recognizing the second gesture; and
forwarding only input obtained with the stylus to the computing device in response to recognizing the second gesture, while ignoring for forwarding to the computing device all input from the finger other than the first gesture.

\* \* \* \* \*